United States Patent [19]

Washabaugh et al.

[11] 3,788,080
[45] Jan. 29, 1974

[54] METHOD OF CONSTRUCTING CONCRETE MANHOLES HAVING SEALED JOINTS WITH PIPES CONNECTED THERETO

[76] Inventors: William E. Washabaugh, 5354 Hilltop Dr.; Edward Peter Washabaugh, Jr., 1701 Mosher, both of Bay City, Mich. 48706

[22] Filed: June 16, 1971

[21] Appl. No.: 153,572

[52] U.S. Cl............ 61/2, 29/157 R, 29/527.1, 52/21, 52/742, 52/746, 137/363, 277/101, 285/194, 285/230, 156/245, 61/11, 61/13, 61/16
[51] Int. Cl............................................. E04b 1/16
[58] Field of Search......... 52/20, 21, 741, 746, 742; 277/101; 29/157 R, 527.1; 137/363; 61/2, 11, 13, 16; 156/245; 285/194, 230

[56] References Cited
UNITED STATES PATENTS

| 3,348,850 | 10/1967 | Scales | 277/101 |
| 3,543,457 | 12/1970 | Budlong | 52/20 X |
| 3,654,952 | 4/1972 | Howe | 137/363 |
| 2,166,632 | 7/1939 | Hardesty et al. | 52/20 X |
| 3,212,519 | 10/1965 | Pascher | 52/21 X |

Primary Examiner—Richard J. Herbst
Assistant Examiner—Donald C. Reiley, III
Attorney, Agent, or Firm—Burton and Parker

[57] ABSTRACT

A method of effecting a joint between a pipe and underground manhole walls or the like utilizes an adapter ring secured and sealed in an aperture of the manhole wall and having an internal diameter accommodating the particular diameter pipe to be sealed with a gasket surrounding the pipe and urged by a gland ring having fasteners cooperating with the adapter ring into fluid pressure sealed relation between the internal diameter of the adapter ring and a radially opposed peripheral surface of the pipe. The construction is such that a workman effecting the pipe joint may work within the safety of the manhole. The adapter rings and manholes have common matching bevelled surfaces and the adapter rings have various internal diameters such that a given manhole may be adapted to various size pipes by selecting the adapter ring having an internal diameter accommodating the particular pipe selected, thereby reducing manhole inventory.

7 Claims, 7 Drawing Figures

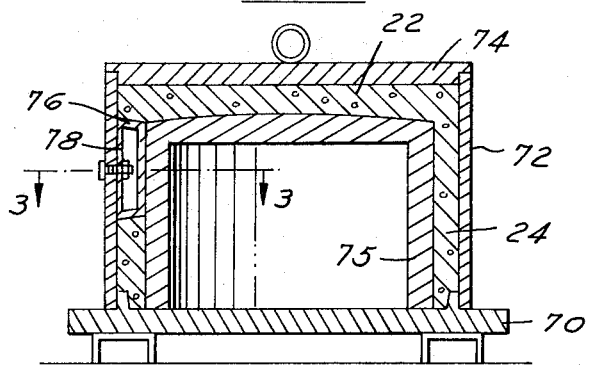
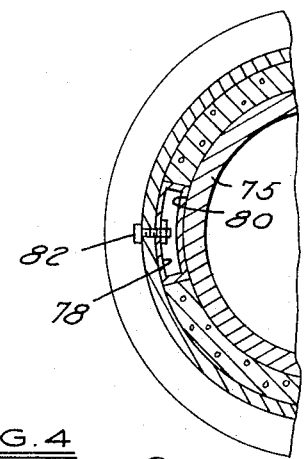
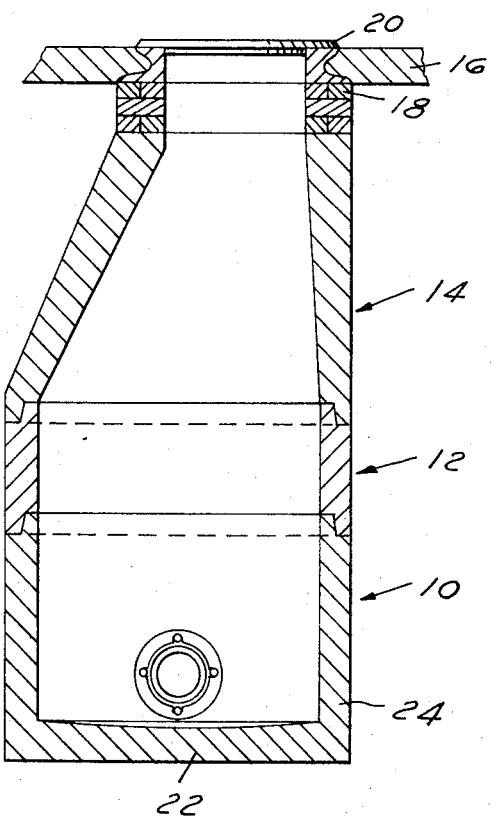
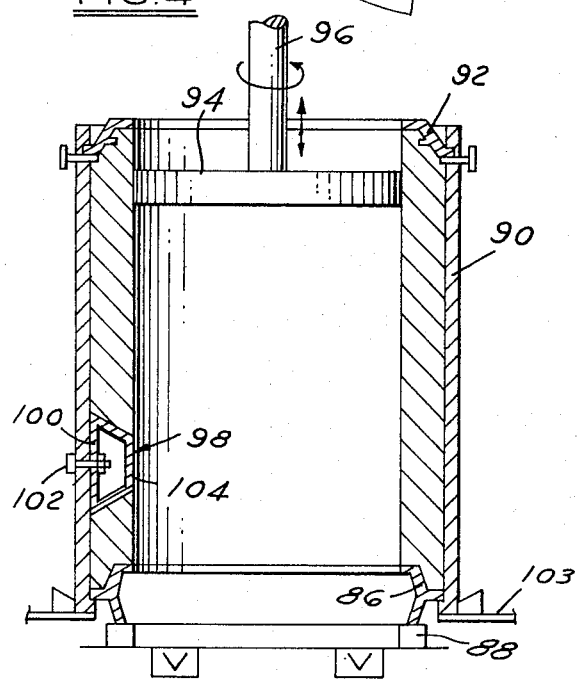

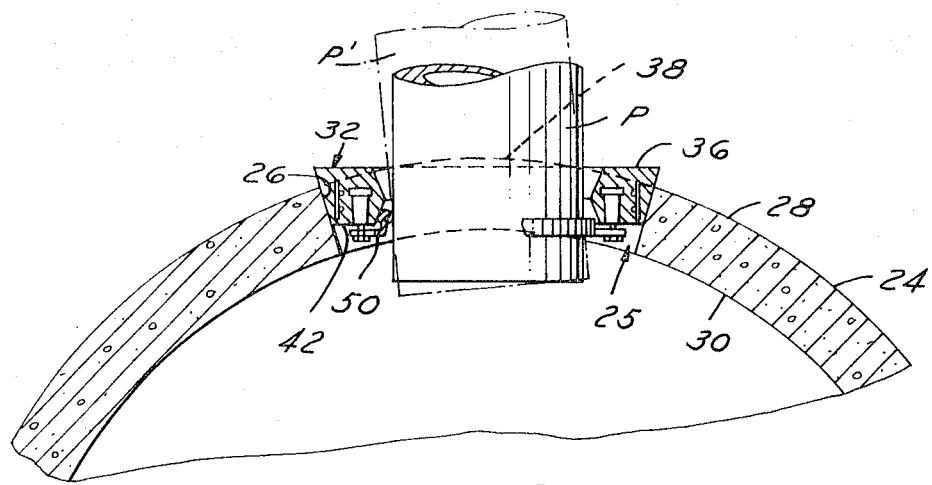
FIG. 6
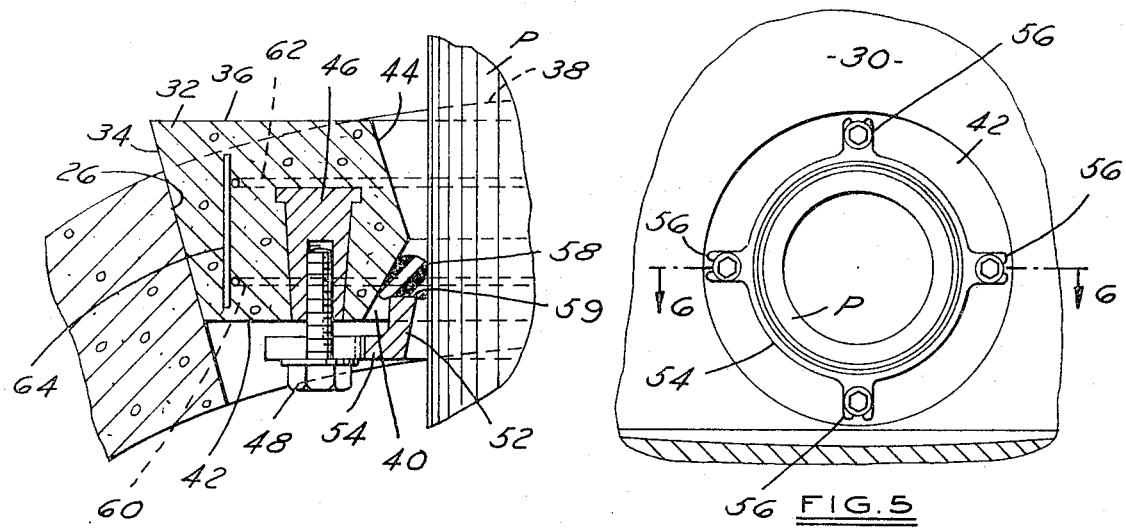
FIG. 7
FIG. 5

METHOD OF CONSTRUCTING CONCRETE MANHOLES HAVING SEALED JOINTS WITH PIPES CONNECTED THERETO

FIELD OF THE INVENTION

This disclosure relates to joints between concrete manholes or the like and pipes to be projected through the manhole wall and sealed therein. The disclosure also relates to methods of constructing such joints and methods of constructing manholes to facilitate effectuating such pipe joints.

BACKGROUND OF THE DISCLOSURE for many years problems have been encountered in effecting long-lasting fluid-tight joints between concrete manholes and the like and pipes to be connected to the manholes. These problems have arisen because of a variety of factors which include but are not limited to the following: wide variations in the configurations and actual external diameters of nominally cylindrical equal diameter pipes to be sealed; the difficulty in accurately forming and sizing manhole pipe-receiving apertures; the tendency of manholes or the pipes joined thereto to shift or settle in the earth thereby imposing strains in the joints and relative movement between the manhole and pipe at the joint tending to destroy the fluid-tight seal; the difficulty in accurately aligning the pipe laid in the trench and the aperture in the manhole wall; and the dangers of cave-in on the workmen in the pipe trench while effecting a seal between the pipe and the manhole. The problems arising from variations in external configuration and pipe diameters of nominally equal pipe and accuracy of alignment of pipe with the manhole aperture have been treated and solutions suggested in U. S. Pat. No. 3,348,850, wherein the manhole wall is provided with a pipe-receiving aperture having an external bevelled entrance and a gland ring and an O-ring gasket are telescoped over the pipe before it is projected through the aperture and the gasket urged axially against the external bevelled aperture entrance by threaded fasteners cooperating with the gland ring and received in threaded inserts in the exterior surface of the manhole wall around the aperture. While the teachings of U.S. Pat. No. 3,348,850 have improved the effectiveness of the pipe joint, substantial problems are inherent with the use of such teachings including the following: the workman must effect the seal at the time the pipe is laid in the trench because both the gland ring and resilient O-ring seal must be inserted over the pipe before the same is projected through the manhole wall, and thereafter the workman must tighten the threaded fasteners from outside the manhole, and during all such he is subjected to the danger of trench cave-in; upon filling the pipe trench, should a leak subsequently occur in the joint, the earth must be removed to gain access to the joint to tighten it; the pipe manufacturer must maintain a substantial inventory of manholes which differ from one another only in the size of the pipe-receiving apertures to accommodate the varying external diameter pipes which may be called for; following the teaching of such patent there is a limitation upon the maximum external diameter pipe that may be sealed in a given diameter manhole, for example in a 48-inch diameter manhole an 18-inch external diameter pipe is the maximum that can be safely used and insure an effective seal, while it would be desirable to allow an effective seal up to a 24-inch external diameter pipe in a 48-inch diameter manhole; the configuration of the aperture in the manhole wall required by the teaching of such patent is difficult to insure during casting of the manhole in the absence of special machinery not possessed by many manhole manufacturers and even if possessed requires special precautions to insure that the aperture is properly and fully formed.

SUMMARY OF THE DISCLOSURE

We have overcome the foregoing objections to the teachings of U.S. Pat. No. 3,348,850 and have also provided a number of other positive advantages in the method of effecting a pipe joint and constructing the manholes associated therewith as taught in this application. In accordance with our disclosure the manholes are formed with a bevelled aperture opening outwardly through the exterior of the manhole wall and into this aperture is secured and sealed an adapter ring having an internal bevel surface which faces in a direction to open into the enclosure of the manhole such that a workman effecting the joint can accomplish the same working within the safety afforded by the manhole itself, it only being necessary to project the pipe during the pipe-laying operation through the internal diameter of the adapter ring and thereafter the joint is completed from within the manhole. As the pipe-laying operation in this regard may be carried out from the surface of the ground, the necessity of sending a workman into the trench at the exterior of the manhole may in some instances be avoided.

As our disclosure provides for effecting the fluid-tight joint between the manhole wall and the pipe from within the manhole, should the joint for any reason begin to leak, it can be serviced from within the manhole without excavating to the pipe outside the manhole. Inventory of manholes may be drastically reduced utilizing the adapter ring concept because manholes may be formed with standard size bevelled apertures therein and the adapter rings may have a standard external bevelled diameter and vary only in the internal bevelled diameter. As the cost of manufacture and inventory of manholes is many times greater than the cost of manufacturing an inventory of adapter rings, a manhole manufacturer may, utilizing our invention, maintain only such number of a given size manhole as may be reasonably demanded, and then maintain an inventory of adapter rings to accommodate anticipated demand for the various diameter pipes. When a customer calls for a given size manhole with a given size pipe, the manhole manufacturer need only select from his manhole inventory the proper diameter manholes, and from his adapter ring inventory those rings having a suitable internal bevelled diameter, and then insert the adapter rings in the selected manholes and secure and seal them therein to satisfy the customer's requirements.

Utilizing the adapter ring larger diameter pipes may be accommodated by a given diameter manhole than is possible with the teaching of U.S. Pat. No. 3,348,850. In addition, utilization of the adapter ring leads to a simplification in both the configuration of the pipe-receiving aperture in the manhole and the method of constructing the manhole, because the more complex aperture configuration required by such patent is not utilized. This in turn leads to economies in manhole manufacture and substantially reduces the uncertainty in the sufficiency of the aperture configuration to afford an effective seal with the pipe.

As the gland ring is connected to the adapter ring, manufacturing problems in assuring satisfactory embedding of fastener-receiving inserts in the manhole wall are overcome.

Other objects, advantages and meritorious features will be apparent from the following description, claims and drawings.

BRIEF DESCRIPTION OF THE FIGURES

FIG. 1 is a cross-sectional elevation through a manhole embodying our improved pipe joint;

FIG. 2 is a schematic cross-sectional elevation through apparatus for manufacturing concrete manholes which will accommodate our improved joint and illustrates method aspects of our invention;

FIG. 3 is a cross-sectional view taken on the line 3—3 of FIG. 2;

FIG. 4 is a schematic cross-sectional elevation through a packer head for making concrete manholes which will accommodate our improved joint and illustrates method aspects of our invention;

FIG. 5 is a fragmentary view on the inside of a manhole showing the pipe joint;

FIG. 6 is a cross-sectional view taken on the line 6—6 of FIG. 5 with a portion of the gland ring omitted for clarity; and FIG. 7 is a fragmentary cross-sectional view through one side of the adapter ring showing the relationship of the same to the manhole wall, the pipe, sealing and gland rings.

DESCRIPTION OF PREFERRED EMBODIMENTS

A typical manhole installation embodying our improved pipe joint is shown in FIG. 1 as including a bottom section 10 having superimposed connected sections 12 and 14 opening upwardly through a paved surface such as a roadway or the like 16 through suitable upper sections 18 and 20. The manhole sections 10, 12 and 14 are formed of concrete. Access may be gained to the interior thereof through the upper section 20 in the usual fashion. The sections 10, 12 and 14 are connected by nested bell and spigot ends in conventional fashion. The bottom 22 of the manhole is shown in FIG. 1 as being integral with the encircling side wall of the lower section 10 but, as is well understood in the art, the bottom may be a separate piece which is suitably interfitted with the lower edge of section 10 and sealed and secured thereto in a conventional manner.

In a typical manhole installation one or more pipe lines are connected to the manhole, generally to the section 10. It is conventional practice to extend the pipe through the wall of the section and seal it therein. The invention herein disclosed is concerned with methods and structures for effecting such pipe joints and is applicable to underground connections between pipes and underground chambers and the term manhole as used herein is intended to generically cover any underground chamber.

The construction and arrangement of a pipe joint embodying the invention is shown particularly in FIGS. 5–7. The generally circular manhole wall 24 is provided with a circular aperture 25 extending therethrough. The aperture is configured to have a bevelled exterior entrance provided by a bevelled wall 26 extending from the exterior surface 28 to the interior surface 30 of the manhole wall 24. The included angle of this bevelled surface 26 as shown in FIG. 6 is approximately 30°. Secured in nested and sealed relation within the aperture 25 is an annular adapter ring 32 in the form of a truncated cone or frustum. The ring has an outer peripheral bevelled surface 34 which matches the bevelled entrance 26 with the external diameter of the adapter ring being such that it will nest down within the aperture substantially as shown in FIGS. 6 and 7. The depth of this nested arrangement is preferably such that the exterior end face 36 lies along its vertical diameter within the exterior peripheral surface 28 of the manhole wall indicated 38 in FIG. 6.

The internal diameter or axial opening through the adapter ring includes a bevelled entrance or sealing portion 40 which opens through that end face 42 of the ring facing the interior of the manhole. The bevelled portion 40 terminates at its inner end at a bevelled entrance portion 44 which extends through the exterior face 36 of the adapter ring. It will be noted that the bevels 34 and 40 of the adapter ring are on opposite angles.

Embedded in the ring at least at three, and in the drawings at four, equidistantly spaced points are internally threaded inserts 46 each adapted to receive a threaded fastener or bolt 48 for securing in adjusted axial positions a rigid gland ring 50. The gland ring includes an axially extending portion 52 and a radial flange portion 54 which is provided at equidistantly spaced locations with bifurcated ears 56 through which are received the bolts with the heads thereof overlying the ears. A rubber O-ring or the like 58 encircles the projecting end of the pipe P and is urged by the end face 59 of the axially extending portion 52 of the gland ring against the bevelled surface 40 of the adapter ring to cause the O-ring to be squeezed radially against an opposed circumferential surface portion of the pipe P to effect a seal between the adapter ring and the pipe.

The O-ring when axially compressed is deformed substantially to the configuration shown in FIG. 7 and serves to support the projecting end of the pipe P spaced inwardly from the walls 40 and 44 of the adapter ring and permits the seal to be effected despite angular displacement of the pipe as to the position P' shown in FIG. 6 and otherwise accommodates for misalignment between the pipe and the aperture in the adapter ring.

The adapter ring is disclosed as being formed of concrete. It may be either wet or dry cast. It is internally reinforced by reinforcing means which are spaced from the external surfaces of the adapter ring. Such reinforcing means may comprise one or more steel reinforcing rings 60 and 62 held in aligned spaced apart relation by suitable spacing wires 64 disposed at circumaxially spaced locations around the reinforcing rings. The rings 60 and 62 together with the spacer 64 may comprise conventional strips of concrete pipe caging which has been bent into circular form with the ends secured together in any suitable fashion as by welding.

In lieu of forming the adapter ring of concrete, the same may be formed of a high durometer rubber or suitable plastic material having the requisite strength and deterioration resistant properties adapting it for the intended use.

Preferably, however, the adapter ring is formed of concrete as such may be economically manufactured. The inserts 46 are cast in the adapter ring at the time of its manufacture and are shaped in the general form of a truncated cone having a flange at the base with the entire configuration of the insert resisting tendency to pull out upon tightening of the bolt.

The adapter ring is, in the preferred form of the invention, secured in the aperture 25 of the manhole wall 24 by adhesive bonding such as an epoxy or urethane adhesive which is spread on either or both of the surfaces 26 and 34 just prior to insertion of the adapter ring into the wall aperture. A number of such adhesives are commercially available which will prove satisfactory in both strength and long enduring qualities and which will effect a fluid-tight seal at the interface between the surfaces 26 and 34.

In practice, the adapter ring is preferably installed in the manhole wall by the manhole manufacturer such that the manhole is shipped to the excavation site with the adapter ring in place. Following placement of the manhole in the ground, the pipe to be connected is laid in a trench outside the manhole and an end thereof projected through the adapter ring as shown in FIG. 6. The workman, operating within the manhole, then telescopes the O-ring 58 over the projecting end of the pipe, followed by the gland ring 50 and urges the O-ring and gland ring axially toward the adapter ring. The bolts 48 are inserted through the bifurcated ears 56 on the gland ring and tightened to axially squeeze the O-ring against the bevelled surface 40 to effect the seal between the adapter ring and the pipe P. The entire operation by the workman in assembling the joint and effecting a fluid-tight seal may be accomplished within the manhole. Upon backfilling the pipe trench outside the manhole, the weight of the earth will press against the exterior end face 36 of the adapter ring urging it into the manhole wall aperture 25. Should it subsequently be discovered that a leak has occurred at the joint between the pipe and the adapter ring, a workman can descend into the manhole and tighten the bolts 48, or alternatively replace the entire O-ring should such be necessary, without disturbing the earth outside the manhole.

By making the pipe joint utilizing the adapter ring disclosed herein it is possible for a given diameter manhole to accommodate a substantially larger pipe than has been possible when following the teaching of U.S. Pat. No. 3,348,850. The reason for this will become apparent from a consideration of FIGS. 6 and 7 wherein it will be noted that as the diameter of the pipe is increased, a point is reached at which a continuous planar sealing surface for accommodating the O-ring will cease to exist if the O-ring is pressed directly against the exterior of the manhole wall as contemplated by such patent. However, by utilizing the adapter ring, the bevelled surface 40 against which the O-ring seals can be made to a greater diameter than heretofore possible because such surface is essentially independent of manhole diameter as the adapter ring itself provides the bevelled sealing surface against which the O-ring seats, and not the surface of the manhole wall. It has been found that, for example, we can provide an effective joint where the pipe diameter is 24-inches and that of the manhole 48-inches.

A substantial economy in the manufacture of manholes may be effected utilizing the disclosure herein disclosed. According to the invention, manholes of a given diameter may be provided with uniform size apertures 25 and the adapter rings to be received therein have correspondingly matching external diameters 34. To accommodate the various size pipes which it may be desired to utilize with the manholes, the adapter rings may be provided with internal apertures of correspondingly varying diameters to accommodate the different size pipes. As a consequence inventory of manholes may be drastically reduced as any manhole in inventory of a given size can, by the insertion of the proper adapter ring, accommodate any given diameter pipe that may be expected to be used with such manhole. As the cost of manufacture and inventory of adapter rings is substantially less than that of manholes, the manhole manufacturer may maintain a much larger inventory of adapter rings and a smaller inventory of manholes with his total investment substantially less than was heretofore possible while taking advantage of the O-ring and gland type joint.

In the manufacture of manholes for effecting pipe joints according to the teachings hereinbefore described, and considering conventional practices in manufacturing manholes, there is shown in FIGS. 2–4 methods of manhole manufacture according to the disclosure. In FIG. 2 the manhole section is manufactured to provide integral side wall 24 and bottom wall 22. The manhole section is cast upside down on a support shown schematically at 70. An outer strippable form 72 closed at the top by a top form 74 defines the exterior configuration of the manhole section. The internal configuration of the manhole section is defined by an inner form 75 supported on the support 70. To form the aperture 25 in the manhole wall a frusto-conical plug 76 is disposed between the inner and outer forms with its base 78 against the inner surface of the outer form 72 and its top 80 against the inner form 75. The base 74 and top 80 are formed on a curve matching that of the inner and outer wall surfaces of the manhole wall and the plug is secured to the outer form 72 as by a threaded fastener in the form of a bolt 82 which is threaded into the base 78 of the plug.

The outer form may be separable in the conventional manner to allow its easy removal from the manhole. The inner form 75 may be formed for slight inward collapse or disassembly to similarly allow easy removal from within the formed manhole. However, until the manhole concrete has cured, it is the practice to maintain the manhole in its inverted position as shown in FIG. 2 whereby access to its interior cannot be gained until the manhole is reverted to its normal position with the bottom wall 22 disposed lowermost and with the section open at the top.

Before casting the manhole according to the method disclosed in FIGS. 2 and 3, the frusto-conical plug 76 is attached to the outer form. With the top form section 74 removed, concrete is packed between the inner and outer forms and about the conical plug and thereafter the top 74 may be added, or if desired omitted following smoothing of the exterior of the bottom wall 22. When the concrete will hold its shape without aid of the outer form 72, the latter may be stripped from the manhole after removal of the bolt 82. Following stripping, the frusto-conical plug may be removed and final curing of the concrete effected. It will be noted that the plug may be removed from the manhole wall without the need of gaining access to the interior of the manhole section, as is the case with the method of U.S. Pat. No. 3,348,850, and this allows earlier reuse of the frusto-conical plug 86 in the manufacture of succeeding manholes than if it were necessary to wait until the manhole could be inverted to gain access to its interior. Such inversion is in practice delayed until the concrete is substantially completely cured so as to avoid any danger of disturbing proper setting of the concrete in its properly compacted or formed condition.

In FIG. 4 the method of making a manhole section on a packer head incorporating the invention is disclosed. The packer head is of conventional construction and is schematically illustrated. The packer head method of pipe casting utilizes a base ring 86 supported by an outer strippable form 90 which is separable to allow its subsequent removal from the manhole section. Form 90 is supported on the table 103 and extends upwardly to a spigot-forming ring 92. The packer head 94 is carried by a vertically reciprocable and rotatable shaft 96. Vibrators V are mounted on the vibrator ring 88 to effect radial vibration of the concrete during the bell packing operation.

A frusto-conical plug 98 corresponding to that heretofore described is secured with its base 100 against the inner surface of the outer form 90 with the plug being held to the outer form by a threaded fastener or the like 102 which is threaded into the base 100. The top 104 of the plug is concave and lies flush with what will be the inner surface of the manhole section. As is understood in the art, with the packer head 94 disposed adjacent the base ring 86, concrete is introduced above the packer head and as the same revolves the concrete is swept radially outwardly against the outer form and downwardly against the base ring and as the packer head continues to rotate and is elevated and concrete added, the manhole section is formed until the upper ring is reached. During such vertical and rotational movements of the packer head the rollers R serve to compact the concrete against the outer form and about the frusto-conical plug 98. By virtue of the frusto-conical shape of the plug 98 the concrete is suitably packed thereabout despite the fact that the packer head is only unidirectionally rotated. Upon completion of the manhole section the packer head is withdrawn out of the top of the manhole section and the thus formed manhole and the base and upper rings moved as a unit to a curing site where the outer form is stripped following removal of the threaded fastener 102. The frusto-conical plug may be temporarily left in the green concrete until it has set sufficiently so that the plug may be removed without sagging of the concrete. In practice the plug may be removed before full curing of the concrete to allow reuse of the plug in subsequent manufacture of succeeding manhole sections while the section from which the plug is removed continues its curing.

It will be apparent from the above description that it would be possible to utilize the same adapter rings in various diameter manhole sections simply by forming the proper diameter aperture 25 having the bevelled entrance 26 corresponding to that of the adapter rings. In this fashion economies may be effected in inventory of adapter rings, as an adapter ring for say a 16-inch diameter pipe may be utilized in manhole sections of 48-inch diameter, 72 1inch diameter, etc.

What is claimed is:

1. In the method of constructing concrete manholes or the like to provide a sealing surface for effectuating a sealed pipe joint with the manhole wall wherein the manholes are formed within a strippable form the improvement comprising the steps of:

securing to the inner surface of the form a frusto-conical plug with its base against the form and its top projecting to the inner surface wall line of the manhole to be formed, forming the concrete manhole within the form, releasing the plug from the form and stripping the form from the manhole wall, removing the plug from the formed manhole wall by extracting it from the exterior of the manhole, forming an adapter ring having a bevelled exterior diameter matching the bevel aperture formed by the plug in the manhole wall and having an internal bevelled diameter providing a sealing surface sized to closely embrace a pipe to be connected to the manhole, and inserting and sealing the adapter ring in the manhole aperture formed by the plug.

2. The invention defined in claim 1 wherein the adapter ring is inserted and sealed in the manhole aperture following curing of the manhole wall.

3. The invention defined in claim 2 wherein the adapter ring is sealed and retained in the manhole aperture by adhesively securing it therein.

4. The invention defined in claim 1 wherein the adapter ring is formed of concrete.

5. The method of constructing sealed joints between pipes and underground manhole walls or the like comprising:

forming manholes with uniform diameter apertures through the walls thereof for receiving therein adapter rings, forming adapter rings having in common an external diameter and configuration to be secured and sealed in the manhole wall apertures and having selected internal diameters to accommodate selected pipe diameters, during formation of the adapter rings providing an internal bevelled surface extending axially and radially outwardly to face interiorly of a manhole when the ring is secured and sealed in the aperture thereof, securing and sealing in the manhole apertures the formed adapter rings having internal diameters adapted for sealing with the diameter of pipe to be joined to the manhole, installing the manholes in the ground, laying pipe in a trench outside the manhole and projecting an end of the pipe through the adapter ring, positioning a resilient gasket about the end of the pipe projecting interiorly of the manhole, and urging the gasket from within the manhole against the inwardly facing bevelled surface of the adapter ring to squeeze the gasket against an opposed surface of the pipe to seal the pipe in the manhole wall.

6. In the method of constructing concrete manholes or the like to facilitate effectuating a sealed pipe joint between the manhole wall and various diameter pipes wherein the manholes are formed within a strippable form, the improvement comprising the steps of:

securing to the inner surface of the form a frusto-conical plug with one end against the form and its other end projecting to the inner surface wall line of the manhole to be formed, forming the concrete manhole within the form and about the plug, releasing the plug from the form and stripping the form from the manhole wall, removing the plug from the formed manhole wall, forming an adapter ring having a bevelled exterior diameter matching the bevel aperture formed by the plug in the manhole wall and having an internal diameter sized to closely embrace the diameter pipe to be connected to the manhole, and inserting and sealing the adapter ring in the manhole aperture formed by the plug.

7. The method of constructing sealed joints between pipes and underground manhole walls or the like comprising:

forming manholes with uniform diameter apertures through the walls thereof for receiving therein adapter rings, forming adapter rings having in common an external diameter and configuration to be secured and sealed in the manhole wall apertures and having selected internal diameters to accommodate selected pipe diameters, securing and sealing in the manhole apertures the formed adapter rings having internal diameters adapted for sealing with the diameter of pipe to be joined to the manhole, installing the manholes in the ground, laying pipe in a trench outside the manhole and projecting an end of the pipe through the adapter ring, and from within the manhole effecting an annular seal between the pipe and the adapter ring through the annular space between the internal bevelled surface of the ring and the confronting surface of the pipe.

* * * * *